(12) United States Patent
Powell et al.

(10) Patent No.: US 8,769,082 B2
(45) Date of Patent: Jul. 1, 2014

(54) METHOD AND SYSTEM FOR PHY INITIATED WAKE-UP IN ENERGY EFFICIENT ETHERNET NETWORKS

(75) Inventors: Scott Powell, Carlsbad, CA (US); Peiqing Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 685 days.

(21) Appl. No.: 12/508,999

(22) Filed: Jul. 24, 2009

(65) Prior Publication Data

US 2011/0022699 A1  Jan. 27, 2011

(51) Int. Cl.
*G06F 15/173* (2006.01)

(52) U.S. Cl.
USPC .......................................... 709/224; 370/463

(58) Field of Classification Search
USPC .......................................... 709/224; 370/463
See application file for complete search history.

(56) References Cited

U.S. PATENT DOCUMENTS

| 6,795,450 | B1 | 9/2004 | Mills et al. | |
|---|---|---|---|---|
| 7,023,425 | B2 * | 4/2006 | Casebolt et al. | 345/163 |
| 7,583,985 | B2 * | 9/2009 | Matson et al. | 455/574 |

* cited by examiner

*Primary Examiner* — Adnan Mirza
(74) *Attorney, Agent, or Firm* — Oblon, Spivak, McClelland, Maier & Neustadt, L.L.P.

(57) ABSTRACT

One or both link partners coupled via an Ethernet link may comprise a PHY device operable to initiate a wake-up interval. The PHY device may monitor parameters that may indicate Ethernet link status. Exemplary parameters may comprise a timer, communication performance metrics and/or configuration parameters. From a low power mode, the PHY device may generate a wake state idle symbol based on the monitoring and may communicate it to a local and/or a remote MAC. The local and/or remote MAC may establish a wake-up interval. The wake-up interval may comprise synchronization, circuit adaption and updating of communication parameters, which may enable control of noise cancellation functions and/or equalization functions. One or both of the link partners may transition to a low power mode after the wake-up interval and/or to an active state after the wake-up interval.

20 Claims, 6 Drawing Sheets

METHOD AND SYSTEM FOR PHY INITIATED WAKE-UP IN ENERGY EFFICIENT ETHERNET NETWORKS

CROSS-REFERENCE TO RELATED APPLICATIONS/INCORPORATION BY REFERENCE

Not Applicable

FIELD OF THE INVENTION

Certain embodiments of the invention relate to networking. More specifically, certain embodiments of the invention relate to a method and system for PHY initiated wake-up in energy efficient Ethernet networks.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for PHY initiated wake-up in energy efficient Ethernet networks, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for PHY initiated wake-up in energy efficient Ethernet networks. In various embodiments of the invention, an Ethernet network may comprise link partners that may be coupled via an Ethernet link. One or both of the link partners may comprise a physical layer device (PHY) that may be operable to initiate a wake-up interval. In this regard, the PHY device may monitor one or more parameters which may be indicative of a status of the Ethernet link and/or one or both of the link partners. The parameters, which may be indicative of a status of the Ethernet link and/or one or both of the link partners, may comprise one or more of a timer, communication performance metrics and/or configuration parameters. The PHY device may generate a wake state idle symbol based on the monitoring. In addition, the PHY device may communicate the generated wake state idle symbol to a media access controller (MAC). The MAC may establish a wake-up interval based on the communicated wake state idle symbol. The link partners may be in a low power mode prior to the wake-up interval. The wake-up interval may comprise one or more of synchronization, circuit adaption and updating of communication parameters. Based on the circuit adaption and/or the updating of communication parameters, noise cancellation functions and/or equalization functions may be controlled. In some instances, the wake state idle symbol may be communicated to a MAC, which is local to the PHY device that generated the symbol. In other instances, the wake state idle symbol may be communicated to a media access controller, which is not local to the PHY device that generated the symbol. One or both of the link partners may transition to a low power mode after the wake-up interval and/or to an active state after the wake-up interval.

Figure 1:
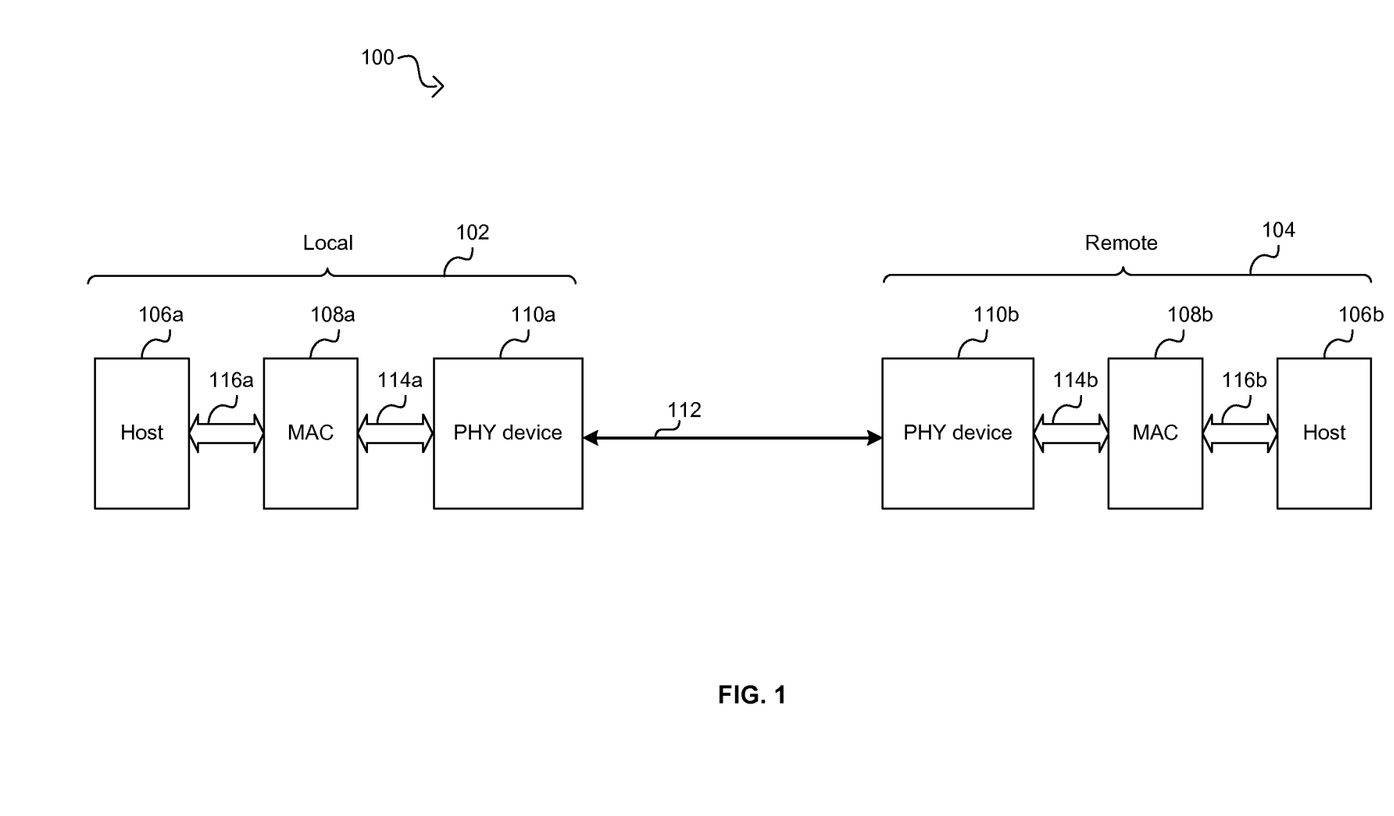
FIG. 1 is a block diagram illustrating an exemplary Ethernet connection between two network devices, in accordance with an embodiment of the invention.

FIG. 1 is a block diagram illustrating an exemplary Ethernet connection between a two network devices, in accordance with an embodiment of the invention. Referring to FIG. 1, there is shown a system 100 that comprises a local network device 102 and a remote network device 104. In addition, there is shown two hosts 106a and 106b, two MAC controllers 108a and 108b, two PHY devices 110a and 110b, two controllers 114a and 114b, two bus controller interfaces 116a and 116b and a link 112

The network devices 102 and 104 may communicate via the link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10 BASE-T and 100 BASE-TX may utilize two pairs of UTP while Ethernet over twisted pair standards 1000 BASE-T and 10 GBASE-T may utilize four pairs of UTP.

In an exemplary embodiment of the invention, the network devices 102 and/or 104 may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In another exemplary embodiment of the invention, the network devices 102 and/or 104 may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In another exemplary embodiment of the invention, the network devices 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the network devices 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

The local network device 102 may comprise a host 106a, a medium access control (MAC) controller 108a, and a PHY device 110a. The remote network device 104 may comprise a host 106b, a MAC controller 108b, and a PHY device 110b. Notwithstanding, the invention is not limited in this regard. In various embodiments of the invention, the network device 102 and/or 104 may comprise, for example, one or more of a switch, end point, router, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the local network device 102 and the remote network device 104. In this regard, the PHY devices 110a and 110b may communicate via a media dependent interface (MDI). The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rate limits and/or non-standard data rate limits. Moreover, the PHY devices 110a and 110b may support standard Ethernet link lengths or ranges of operation and/or extended ranges of operation.

In various embodiments of the invention, the PHY devices 110a and 110b may comprise suitable logic, circuitry, and/or code that may enable transmission and/or reception at a high(er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3.

In an exemplary embodiment of the invention illustrated in FIG. 1, the hosts 106a and 106b may implement OSI layer 3 and above, the MAC controllers 108a and 108b may implement OSI layer 2 and above and the PHY devices 110a and 110b may implement the operability and/or functionality of OSI layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which comprise, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the link 112 and/or to decode data packets received from the link 112.

The MAC controller 108a may comprise suitable logic, circuitry, and/or code that may enable handling of data link layer, layer 2, operability and/or functionality in the network device 102. Similarly, the MAC controller 108b may comprise suitable logic, circuitry, and/or code that may enable handling of layer 2 operability and/or functionality in the network device 104. The MAC controllers 108a and 108b may be configured to implement Ethernet protocols, such as those based on the IEEE 802.3 standard, for example. Moreover, one or both of the MAC controllers 108a and 108b may be configured to implement the Ethernet protocol IEEE 802.3az. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may comprise multi-rate capable interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels having a fixed data rate limit which may result in network links being underutilized and transmitting IDLE symbols for significant portions of time. In this regard, when the network devices 102 and 104 may initiate a connection, may exchange some preliminary information and/or training signals. The network devices 102 and 104 may negotiate a data rate limit (e.g., 10 Gbps) and duplex mode (e.g., full-duplex) for communicating with each other. Additionally, in order to establish reliable communications, each of the network devices 102 and 104 may need to "train" or adjust various parameters and/or circuitry in a network device to account for variables such as the type of cabling over which data is being communicated and the environmental conditions (e.g. temperature or noise) surrounding the cabling. Once the network devices are "trained", they may initially transmit data at 10 Gbps, for example. In this regard, conventional PHY devices may distribute traffic evenly over all available physical channels and may continuously transmit IDLE symbols between packets of actual data. However, based, for example, on link utilization, past or present traffic statistics, and/or available resources (e.g., power, buffer space, processor time, etc.), it may be determined that 10 Gbps may be higher than necessary or desired. Accordingly, controlling the data rate limit of the connection between the network devices 102 and 104 may enable the network devices 102 and 104 to communicate in a more energy efficient manner. Moreover, while the data rate limit on the link 112 may be low(er), higher layer functions and/or resources, such as portions of the MAC controller may be placed into a low(er) power mode. The data rate limit may be controlled by, for example, controlling a number of physical channels utilized to communicate data, controlling the signal constellation utilized for representing data on the link, controlling a rate at which symbols are transmitted, and controlling the length of time between frames (the inter-frame gap). In this manner, aspects of the invention may enable network designers and/or administrators to control, with fine precision via a plurality of data rate variables, a data rate limit on an Ethernet link. At any given time instant, the data rate limit may determine the maximum data rate which the link may support at that instant. In instances that the actual data rate on the link is less than the data rate limit, the difference between the data rate limit and the actual data rate may correspond to wasted energy on the link and/or in network devices communicatively coupled to the link.

In various embodiments of the invention, a data rate limit of a network link may be controlled to meet demands on the link, and this may result in a fixed actual data rate on the link which may effectively reduce or eliminate issues associated with links transporting bursty traffic. For example, controlling and/or determining traffic attributes (e.g., inter-frame gap times and network latencies) and/or network resources (e.g., buffer capacity and utilization) may be simplified when dealing with fixed rate traffic. Moreover, certain traffic types, such as video and audio streams, may inherently be of a fixed actual data rate and may thus lend themselves to efficient transmission over a link utilizing a fixed data rate limit.

Figure 2:
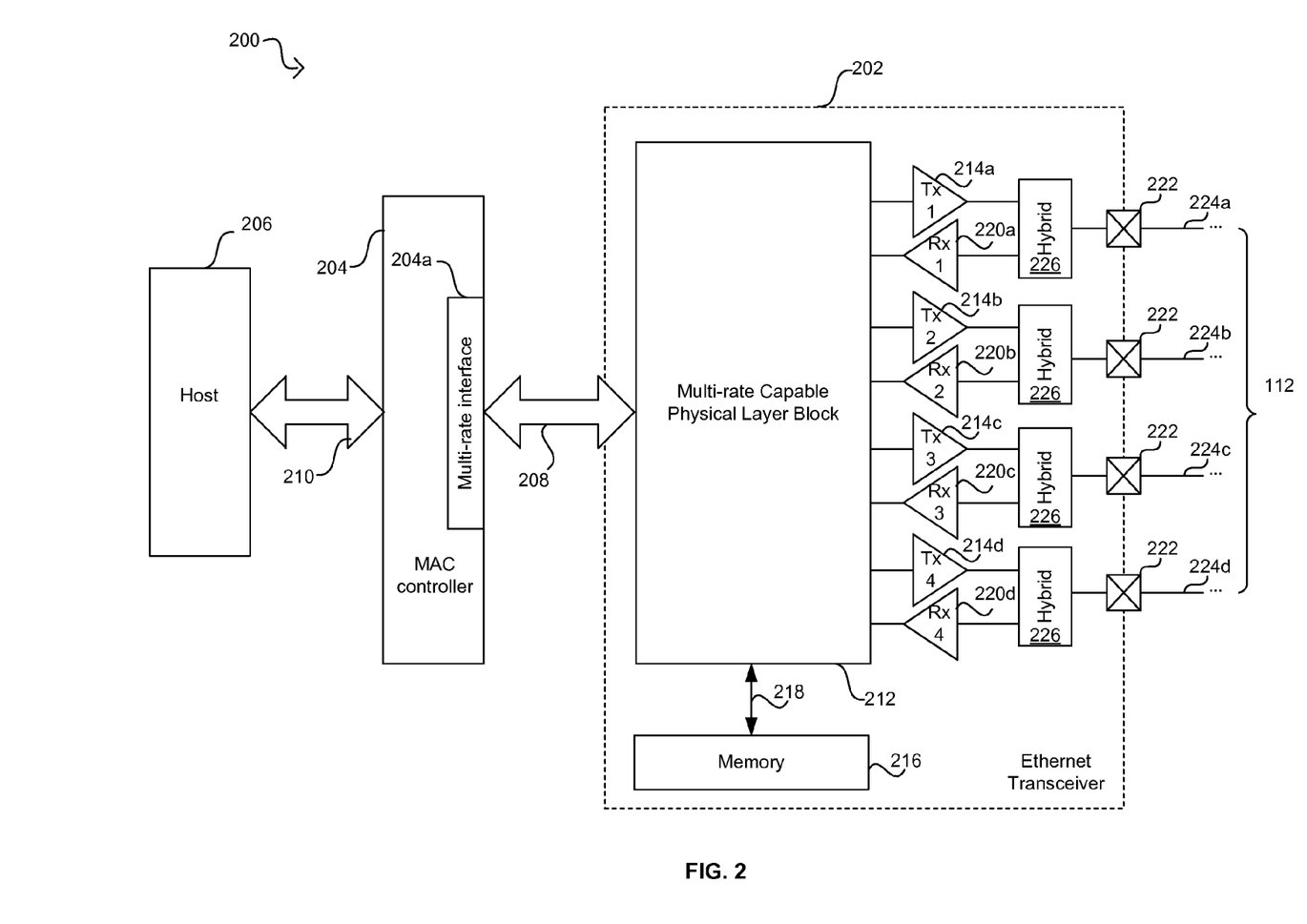
FIG. 2 is a block diagram illustrating an exemplary Ethernet over twisted pair PHY device architecture operable to initiate a wake state, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that may comprise a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and/or 110b disclosed in FIG. 1. In this regard, the PHY device 202 may provide layer 1 (physical layer) operability and/or functionality that may enable communication with a remote PHY device. Similarly, the operation of the MAC controller 204, the host 206, the interface 208, and the bus controller 210 may be similar or substantially the same as the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating appropriate link discovery signaling utilized for establishing communication with a remote PHY device in a remote network device. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement, for example, a different communication protocol. These communication modes may include, but are not limited to, Ethernet over twisted pair standards 10 BASE-T, 100 BASE-TX, 1000 BASE-T, 10 GBASE-T, and other similar protocols that utilize multiple physical channels between network devices. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that may comprise parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, interface and/or code that may enable transmission of data from the network device 200 to a remote network device via, for example, the link 112 in FIG. 1. The receivers 220a, 220b, 220c, 220d may comprise suitable logic, circuitry, interface(s) and/or code that may enable receiving data from a remote network device. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. The transmitter/receiver pairs may be enabled to provide an appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the network device 200 may comprise a number of hybrids 226 corresponding to the number of physical links. Each hybrid 226 may comprise suitable logic, circuitry, interface and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the network device 300 may be communicatively coupled to an input/output interface 222.

The network device 200 may communicate with a remote partner via the link 112. For example, the PHY device 202 may communicate based on 100 BASE-TX, 1000 BASE-T and/or 10 GBASE-T. The PHY device 202 may transmit data to and/or receive data from the remote partner via the physical channels 224a, 224b, 224c, and 224d. In instances when the network device 200 may be in an active state and there is no data available to transmit, the network device 200 may transmit IDLE symbols to a remote link partner. The IDLE symbols may keep the local and/or the remote partners "trained." In this manner, power consumption of a network may be largely independent of the amount of actual data being transmitted over the network. Accordingly, controlling the data rate limit on the link 112 may enable the network devices 200 to transmit fewer active state IDLE symbols and thus communicate in a more energy efficient manner.

The network device 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable PHY block 212 associated with the unused physical channels may be disabled. A channel in a low(er) power state may operate in one or more ways. For example, one or more channels may convey little or no data, may be silent, may convey IDLE symbols and/or convey other energy. In some instances, all channels of a link may be placed into a low(er) power state. Furthermore, the PHY device 202 as well as the MAC controller 204 may be put to sleep.

The PHY device 202 and/or one or more components implementing the layers above the PHY layer may be placed in a low power idle mode (LPI) wherein the PHY device 202 and/or higher layer components may be powered down during idle periods. During power down, the PHY device 202 may maintain various coefficients and may maintain synchronization to allow for a more rapid return to an active state. In addition, during LPI mode, a portion of the receiver circuitry may be turned off. In asymmetric systems, devices that handle one direction of communication may be in a quiet state independent of devices that handle communication in an opposite direction. In synchronous systems, both directions of a PHY device may enter and/or leave a quiet state together. Although a PHY device may operate in a synchronous mode, OSI layers above the PHY may operate in an asymmetric mode.

Figure 3A:
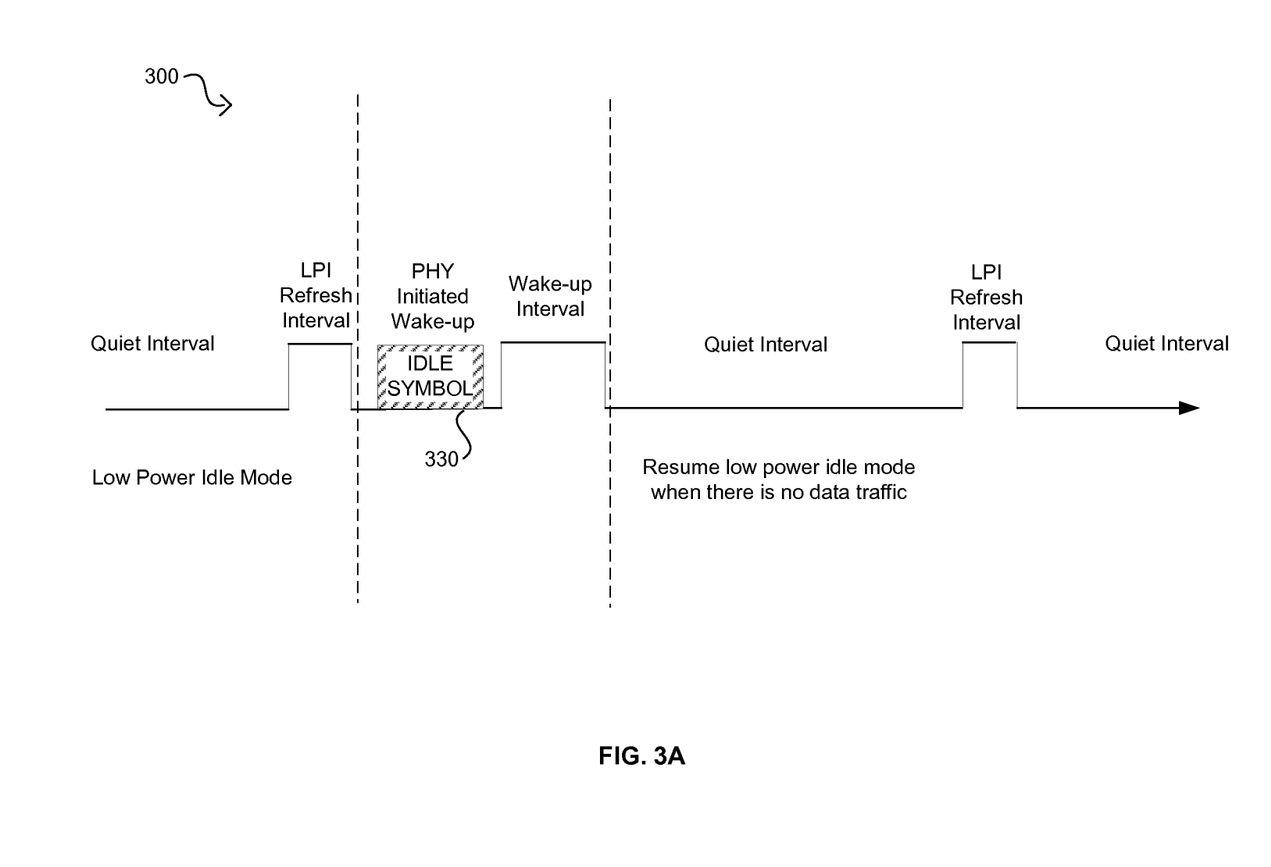
FIG. 3A is a diagram illustrating exemplary PHY device signaling that may initiate a transition from a low power idle mode to a wake-up interval, in accordance with an embodiment of the invention.

FIG. 3A is a diagram illustrating exemplary PHY device signaling that may initiate a transition from a low power idle mode to a wake-up interval, in accordance with an embodiment of the invention. Referring to FIG. 3A, there is shown a time line 300 comprising a wake state idle symbol 330.

In operation, the PHY device 202 described with respect to FIG. 2 and FIG. 1 may be configured to transition between an active state and a low(er) power mode, for example, a low power idle mode. During an active state, the PHY device 202 may transmit data on a media dependent interface (shown in FIGS. 3B and 3C). In instances when there is no data available to transmit, the PHY device 202 in an active state may transmit wake state idle symbols. The PHY device 202 power dissipation may be nearly the same when transmitting wake state idle symbols and when transmitting actual data. In this regard, power consumption may not be significantly reduced during periods of low link utilization. During periods when data may not be available for transmission, the MAC 204 may order the PHY device 202 to enter a low power idle (LPI) mode that may enable a reduction of power consumption during periods of low link utilization.

During LPI mode, the PHY device 202 may cycle between quiet intervals and refresh intervals. The refresh intervals may be separated by large intervals of inactivity that may be referred to as the quiet interval. The quiet interval duration in some instances may be short enough to keep synchronization from drifting appreciably between refresh intervals. However, during lengthy quiet intervals, temperature drifts, frequency drifts and/or external noise may occur such that synchronization and adaptive circuit compensation may not be maintained accurately enough to mitigate communication errors and/or link failure upon wake-up. During the idle mode refresh intervals, the PHY device 202 may be operable to perform synchronization activity with the remote link partner and/or may adapt signal processing parameters and/or circuits. In this regard, the PHY device 202 may coordinate transmissions of short bursts of LPI idle signaling to the remote link partner. LPI idle signaling may enable synchronization, equalization and/or noise cancellation functions to be maintained. A transition from an LPI mode to an active mode may be referred to as a wake-up interval.

In accordance with an embodiment of the invention, a refresh interval may be extended in order to improve link maintenance and/or to enable a PHY device to wake within a specified period of time with error free operation. For example, the PHY device 202 may determine when an extended refresh interval may be beneficial and/or may be needed to avoid link failure. In this regard, the PHY device 202 may monitor the health of the communication path among the link partners 102 and/or 104. For example, the PHY device 202 may determine a mean square error; it may monitor descrambling errors and or monitor frequency drift. In various embodiments of the invention, the PHY device 202 may set a timer for a specified duration of an LPI interval so that link partners may wake up for an extended period of time to refresh circuitry and/or to refresh communication parameters. The PHY device 202 may generate a wake-up signal that may initiate a wake-up interval for the local and/or remote link partners 102 and 104. For example, the PHY device 202 may transmit a wake state idle symbol 330. The wake state idle symbol 330 may comprise control codes that may indicate to other elements of the communication link to enter a wake interval providing an extended time period to refresh circuitry and/or refresh communication parameters. The PHY device 202 may wake up link partners 102 and/or 104 prior to appreciable degradation of link performance and may thus enable a rapid return to a fully active state ready to transmit data without bit or packet errors. The wake state idle symbol 330 may be an IEEE 802.3 compliant idle symbol. The PHY initiated wake-up may be controlled by one PHY. The PHY initiated wake-up during an LPI mode may improve link performance while enabling a reduction in power consumption for extended periods of low link utilization. In this regard, the link partners 102 and/or 104 may be configured to comply with energy efficient Ethernet standards IEEE 802.3az. In various embodiments of the invention, the PHY initiated wake-up during an LPI mode may be implemented in one link partner and/or in both of a pair of link partners, for example, the link partners 102 and 104.

Once the PHY device 202 and/or the communication elements of the link partners 102 and/or 104 are refreshed and/or appropriately prepared for communication, the link partners may resume an LPI mode. In instances when data may be available for transmission and/or reception, the PHY device 202 and/or link partners 102 and/or 104 may begin transmitting data across the link 112.

Although the described exemplary embodiment of the invention refers to improving performance during a low power idle mode, the invention is not so limited. The PHY initiated wake-up may be utilized in a plurality of suitable conditions. For example, when an imminent state transition may lead to a link failure state, the PHY initiated wake-up may be utilized to give a communication device additional time to recover and continue communication processes.

Figure 3B:
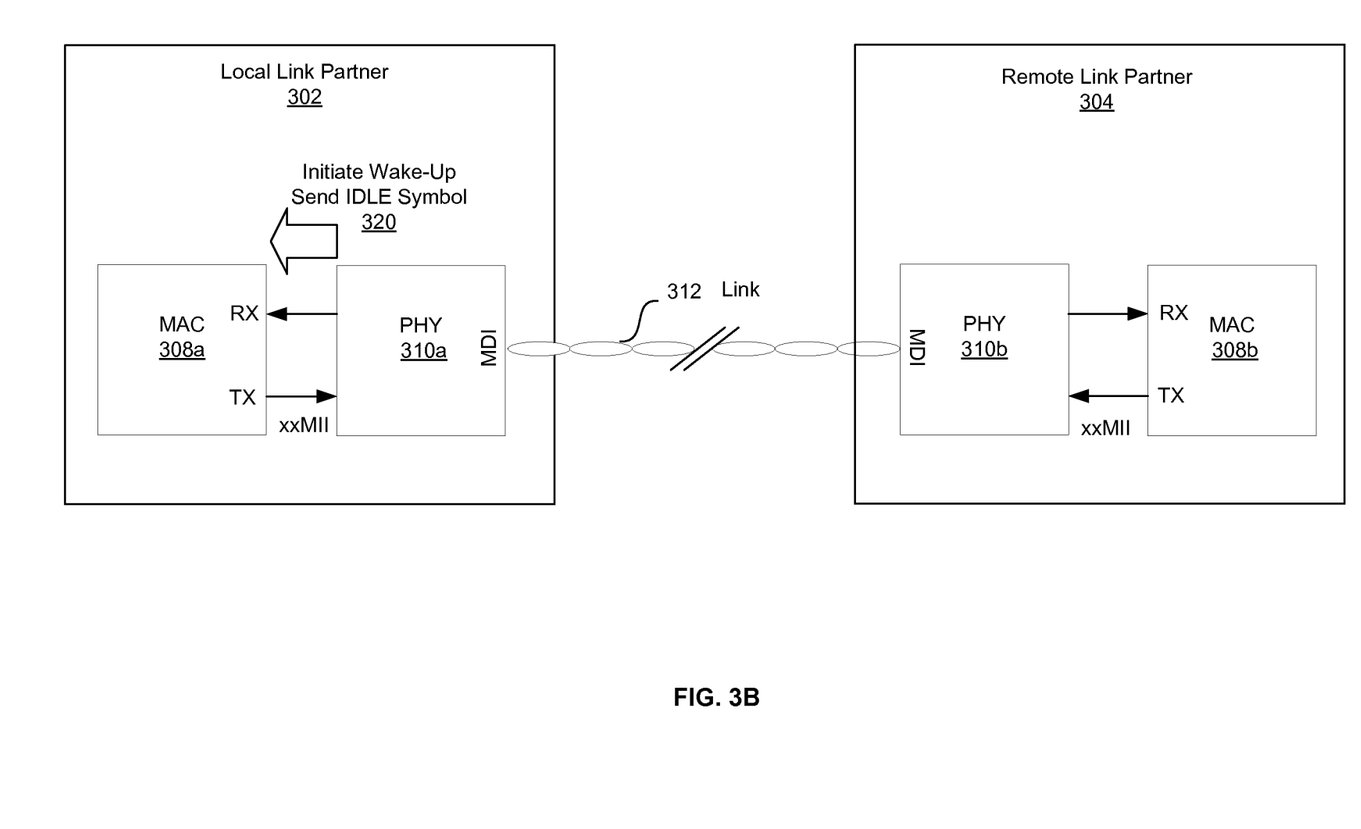
FIG. 3B is a block diagram illustrating an exemplary PHY initiated wake-up signal sent to a local MAC, in accordance with an embodiment of the invention.

FIG. 3B is a block diagram illustrating an exemplary PHY initiated wake-up signal sent to a local MAC, in accordance with an embodiment of the invention. Referring to FIG. 3B there is shown link partners 302 and 304, MAC modules 308a and 308b, PHY devices 310a and 310b, a link 312 and a wake state idle symbol 320.

The link partners 302 and 304 may be similar or substantially the same as the link partners 102 and 104 respectively and/or the network device 200. The MAC modules 308a and 308b may be similar or substantially the same as the MACs 108a and 108b respectively and/or the MAC 204. The PHY devices 310a and 310b may be similar or substantially the same as the PHY devices 110a and 110b respectively and/or the PHY device 202. The link 312 may be similar or substantially the same as the link 112. The wake state idle symbol 320 may be similar and/or substantially the same as the wake state idle 330.

In operation, the PHY device 302 may be functioning in a LPI mode wherein the PHY device 302 may be cycling between quiet intervals and refresh intervals. The PHY device 302 may determine that the link partners 302 and/or 304 may enter a wake-up interval and may refresh circuits and/or communication parameters. For example, the PHY device 302 may detect a maximum LPI interval length that may be determined by a timer or may be alerted by a metric related to the quality of synchronization, equalization and/or noise cancellation estimates. The PHY device 302 may generate a wake state idle symbol 320 and may communicate the idle symbol 320 to the local MAC 308a. The local MAC 308a may receive the wake state idle symbol 320 and may initiate a wake-up process for the link partner 302 and/or the link partner 304. The wake-up process may comprise synchronization and/or adapting circuits and/or updating parameters. When the link partner 302 and/or link partner 304 may be properly configured for improved communication and/or there is no data waiting to be delivered, the link partners may return to LPI mode. In instances when data is available for communication, the link partners 302 and/or 304 may begin transmission and/or reception of the data.

Figure 3C:
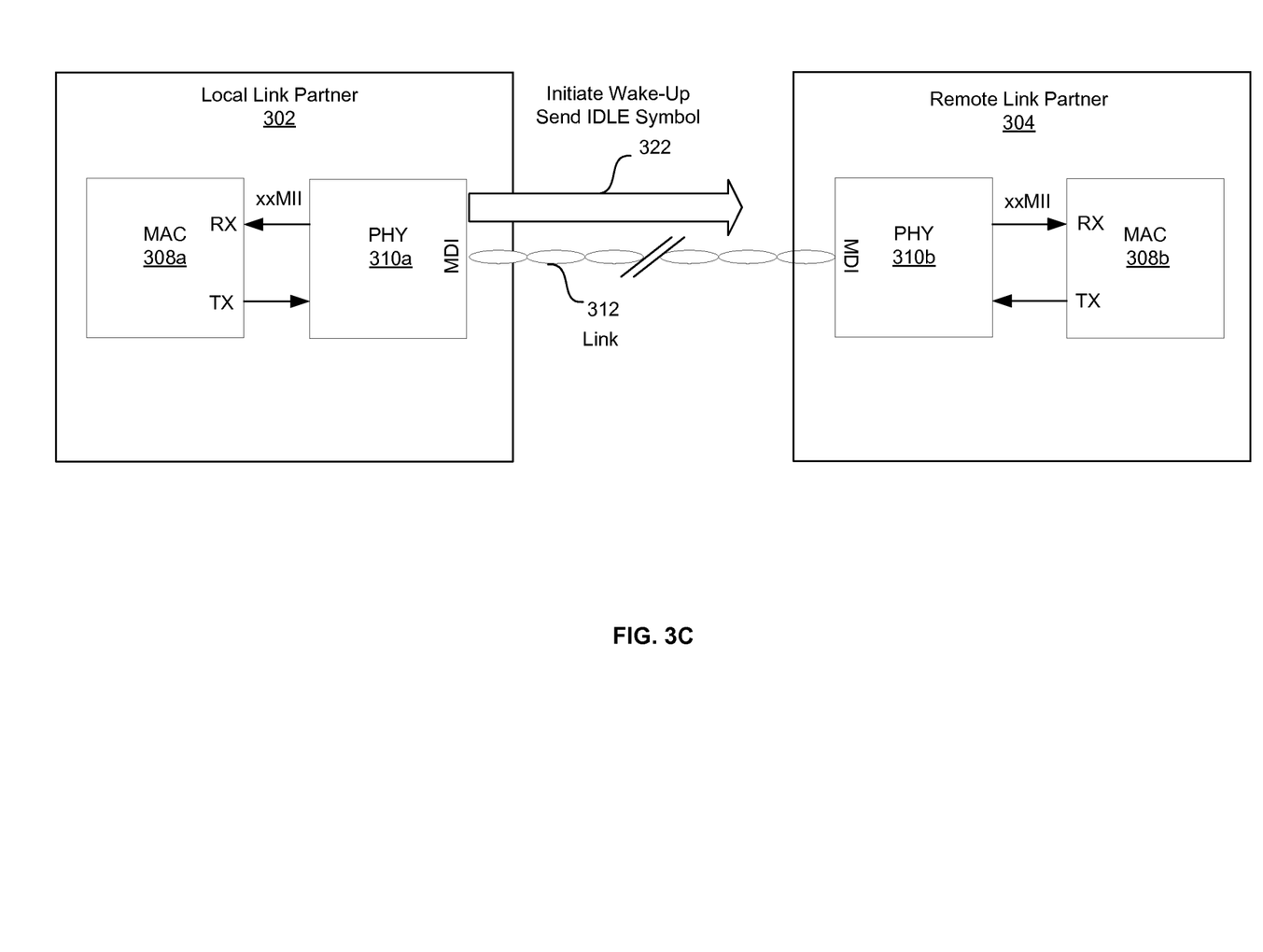
FIG. 3C is a block diagram illustrating an exemplary PHY initiated wake-up signal sent to a remote MAC, in accordance with an embodiment of the invention.

FIG. 3C is a block diagram illustrating exemplary communication of energy efficient control policy information between a PHY layer and a layer above the MAC, in accordance with an embodiment of the invention. Referring to FIG. 3C, there is shown, the link partners 302 and 304, the MAC modules 308a and 308b, the PHY devices 310a and 310b, the link 312 and a wake state idle symbol 322.

The link partners 302 and 304, the MAC modules 308a and 308b, the PHY devices 310a and 310b and the link 312 are described with respect to FIG. 3B. The wake state idle symbol 322 may be similar and/or substantially the same as the wake state idle symbol 320 described with respect to FIGS. 3A and 3B.

In operation, The PHY device 302 may determine that the link partners 302 and/or 304 may enter a wake-up interval and may refresh circuits and/or communication parameters as described with respect to FIG. 3B. The PHY device 302 may generate a wake state idle symbol 322 and may communicate the idle symbol 322 to the remote MAC 308b via the link 312 and the PHY device 310b. The remote MAC 308b may receive the wake state idle symbol 322 and may initiate a wake-up process for the link partner 304 and/or for the link partner 302. The wake-up process may comprise synchronization and/or adaptive circuits and/or updating parameters. When the link partner 304 and/or the link partner 302 may be properly configured for improved communication and/or there is no data waiting to be delivered, the link partners may return to LPI mode. In instances when data is available for communication, the link partners 304 and/or 302 may begin transmission and/or reception of the data.

Figure 4:
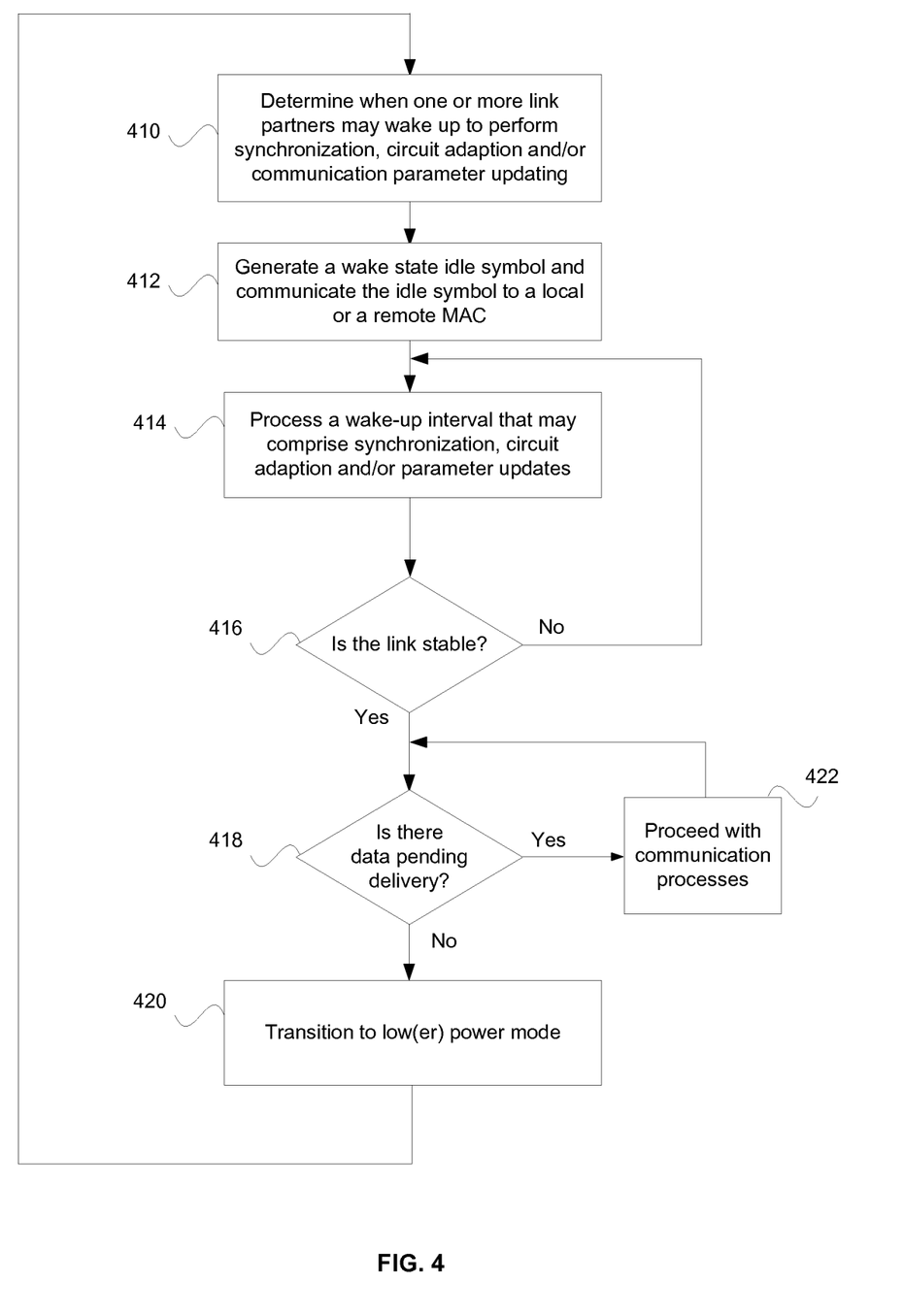
FIG. 4 is a flow chart illustrating exemplary steps for implementing a PHY initiated wake-up cycle, in accordance with an embodiment of the invention.

FIG. 4 is a flow chart illustrating exemplary steps for implementing a PHY initiated wake-up cycle, in accordance with an embodiment of the invention. The exemplary steps may begin with start step 410. In step 410, the PHY device 310a may determine when one or more of the link partners 302 and 304 may wake up to perform synchronization, circuit adaption and/or to update communication parameters. In step 412, the PHY device 310a may generate a wake state idle symbol 330 and may communicate the idle symbol 330 to the local MAC 304a or the remote MAC 304b. In step 414, The MAC 304a and/or the MAC 304b may initiate a wake-up cycle and the local link partner 302 and/or the remote link partner 304 may process a wake-up interval that may comprise synchronization, circuit adaption and/or parameter updates. In step 416, the link status may be checked. In instances when the link is stable, the exemplary steps may proceed to step 418. In step 418, in instances when there is no data pending delivery, the exemplary steps may proceed to step 420. In step 420 the PHY devices 310a and/or 310b may transition to a low(er) power mode, for example, low power idle mode and the exemplary steps may proceed to step 410. In step 416, in instances when the link is not yet stable, the exemplary steps may proceed to step 414 to continue synchronization, circuit adaption and/or parameter updates. In step 418, in instances when there is data pending delivery, the exemplary steps may proceed to step 422. In step 422, the link partners 310a and/or 310b may proceed with communication processes and/or may proceed to exemplary step 418.

In an embodiment of the invention, an Ethernet network may comprise link partners 102 and/or 104 that may be coupled via an Ethernet link 112. One or both of the link partners 102 and/or 104 may comprise a physical layer device (PHY) 202 that may be operable to initiate a wake-up interval. In this regard, the PHY device 202 may monitor one or more parameters which may be indicative of a status of the Ethernet link and/or one or both of the link partners 102 and/or 104. The parameters which may be indicative of a status may comprise one or more of a timer, communication performance metrics and/or configuration parameters. The PHY device 202 may generate a wake state idle symbol based on the monitoring. In addition, the PHY device 202 may communicate the generated wake state idle symbol to a media access controller (MAC) 204. The MAC 204 may establish a wake-up interval based on the communicated wake state idle symbol 330. The link partners 102 and/or 104 may be in a low power mode prior to the wake-up interval. The wake-up interval may comprise one or more of synchronization, circuit adaption and updating of communication parameters. Based on the circuit adaption and/or the updating of communication parameters, noise cancellation functions and/or equalization functions may be controlled. In some instances, the wake state idle symbol 330 may be communicated to a MAC 204 which is local to the PHY device 202 that generated the symbol. In other instances, the wake state idle symbol 330 may be communicated to a MAC 204 which is not local to the PHY device that generated the symbol. For example, a PHY device 110a may communicate the wake state idle symbol 330 to the MAC 108a and/or the MAC 108b described with respect to FIG. 1. One or both of the link partners 102 and/or 104 may transition to a low power mode after the wake-up interval and/or to an active state after the wake-up interval.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for PHY initiated wake-up in energy efficient Ethernet networks.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in an Ethernet network comprising link partners that are coupled via an Ethernet link, each of said link partners comprise a physical layer device, wherein said physical layer device in one or both of said link partners is operable to perform:
monitoring one or more parameters which are indicative of a status of said Ethernet link and/or one or both of said link partners;
generating a wake state idle symbol, based on said monitoring; and
communicating said generated wake state idle symbol to a media access controller, wherein said media access controller establishes a wake-up interval based on said communicated wake state idle symbol and said wake state idle symbol is an Ethernet protocol idle symbol.

2. The method according to claim 1, wherein said wake-up interval comprises one or more of synchronization, circuit adaption and updating of communication parameters.

3. The method according to claim 2, comprising controlling noise cancellation functions based on said circuit adaption and/or said updating of communication parameters.

4. The method according to claim 2, comprising controlling equalization functions based on said circuit adaption and/or said updating of communication parameters.

5. The method according to claim 1, wherein said parameters which are indicative of a status comprise one or more of a timer, communication performance metrics and/or configuration parameters.

6. The method according to claim 1, wherein said link partners are in a low power mode prior to said wake-up interval.

7. The method according to claim 1, comprising communicating said wake state idle symbol to said media access controller which is local to said physical layer device which generated said wake state idle symbol.

8. The method according to claim 1, comprising communicating said wake state idle symbol to said media access controller which is not local to said physical layer device which generated said wake state idle symbol.

9. The method according to claim 1, comprising transitioning to a low power mode after said wake-up interval.

10. The method according to claim 1, comprising transitioning to an active state after said wake-up interval.

11. A system for communication, the system comprising:
one or more circuits for use in an Ethernet network comprising link partners that are coupled via an Ethernet link, said one or more circuits in each of said link partners comprising one or more physical layer devices, wherein said one or more circuits in one or both of said link partners are operable to:
monitor one or more parameters which are indicative of a status of said Ethernet link and/or one or both of said link partners;
generate a wake state idle symbol based on said monitoring; and
communicate said generated wake state idle symbol to a media access controller, wherein said media access controller establishes a wake-up interval based on said communicated wake state idle symbol and said wake state idle symbol is an Ethernet protocol idle symbol.

12. The system according to claim 11, wherein said wake-up interval comprises one or more of synchronization, circuit adaption and updating of communication parameters.

13. The system according to claim 12, wherein said one or more circuits are operable to control noise cancellation functions based on said circuit adaption and/or said updating of communication parameters.

14. The system according to claim 12, wherein said one or more circuits are operable to control equalization functions based on said circuit adaption and/or said updating of communication parameters.

15. The system according to claim 11, wherein said parameters which are indicative of a status comprise-one or more of a timer, communication performance metrics and/or configuration parameters.

16. The system according to claim 11, wherein said link partners are in a low power mode prior to said wake-up interval.

17. The system according to claim 11, wherein said one or more circuits are operable to communicate said wake state idle symbol to said media access controller which is local to said physical layer device which generated said wake state idle symbol.

18. The system according to claim 11, wherein said one or more circuits are operable to communicate said wake state idle symbol to said media access controller which is not local to said physical layer device which generated said wake state idle symbol.

19. The system according to claim 11, wherein said one or more circuits are operable to transition to a low power mode after said wake-up interval.

20. The system according to claim 11, wherein said one or more circuits are operable to transition to an active state after said wake-up interval.

* * * * *